United States Patent
Saari et al.

(10) Patent No.: US 9,414,348 B2
(45) Date of Patent: Aug. 9, 2016

(54) METHOD AND APPARATUS FOR DETERMINING DYNAMIC ACCESS TOKENS FOR LOCATION-BASED SERVICES

(71) Applicant: Nokia Corporation, Espoo (FI)

(72) Inventors: Jarmo Ilkka Saari, Turku (FI); Timo Juhani Toivanen, Mantsala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 413 days.

(21) Appl. No.: 13/867,753

(22) Filed: Apr. 22, 2013

(65) Prior Publication Data

US 2014/0315571 A1    Oct. 23, 2014

(51) Int. Cl.

| | |
|---|---|
| *H04W 24/00* | (2009.01) |
| *H04W 64/00* | (2009.01) |
| *H04W 12/06* | (2009.01) |
| *H04W 48/02* | (2009.01) |
| *H04W 12/08* | (2009.01) |
| *H04W 4/02* | (2009.01) |
| *H04W 4/00* | (2009.01) |
| *H04W 4/12* | (2009.01) |

(52) U.S. Cl.
CPC ............. *H04W 64/00* (2013.01); *H04W 4/02* (2013.01); *H04W 12/06* (2013.01); *H04W 12/08* (2013.01); *H04W 48/02* (2013.01); *H04W 4/008* (2013.01); *H04W 4/12* (2013.01)

(58) Field of Classification Search
CPC ....... H04W 64/00; H04W 4/02; H04W 12/06; H04W 12/08; H04W 48/02; H04W 4/003; H04L 29/08657; G01S 5/02
See application file for complete search history.

(56) References Cited

U.S. PATENT DOCUMENTS

| | | | |
|---|---|---|---|
| 6,813,501 B2 | 11/2004 | Kinnunen et al. | |
| 7,469,139 B2 | 12/2008 | Van de Groenendaal | |
| 2006/0014547 A1 | 1/2006 | Walter | |
| 2008/0172173 A1* | 7/2008 | Chang et al. ................... | 701/207 |
| 2009/0159666 A1* | 6/2009 | O'Brien et al. ................ | 235/380 |
| 2010/0253470 A1* | 10/2010 | Burke ........................... | 340/5.82 |
| 2011/0251892 A1* | 10/2011 | Laracey ....................... | 705/14.51 |
| 2012/0293465 A1* | 11/2012 | Nandu et al. ................... | 345/204 |
| 2013/0065585 A1* | 3/2013 | Pelletier et al. ............. | 455/435.1 |
| 2015/0004935 A1* | 1/2015 | Fu ................................. | 455/411 |

FOREIGN PATENT DOCUMENTS

EP    1766803 A1    3/2007

OTHER PUBLICATIONS http://uk.answers.yahoo.com/question/index?qid=20081104005435AAcYE9e.

* cited by examiner

*Primary Examiner* — Khalid Shaheed

(74) *Attorney, Agent, or Firm* — Ditthavong & Steiner, P.C.

(57) ABSTRACT

An approach is provided for a mechanism to determine dynamic information for generating dynamic access tokens to a location-based service. The approach includes a method for determining one or more dynamic information items associated with at least one location in which at least one service is available. The approach also includes a method for determining at least one procedure for generating one or more access tokens associated with the at least one service. The approach further includes a method for processing and/or facilitating a processing of the one or more dynamic information items using, at least in part, the at least one procedure to cause, at least in part, a generation of the one or more access tokens.

18 Claims, 11 Drawing Sheets

METHOD AND APPARATUS FOR DETERMINING DYNAMIC ACCESS TOKENS FOR LOCATION-BASED SERVICES

BACKGROUND

Service providers (e.g., wireless, cellular, etc.) and device manufacturers are continually challenged to deliver value and convenience to consumers by, for example, providing compelling network services. One area of interest is providing location-based services to a plurality of users and user devices, for example, shared network communication services. In one scenario, a service provider, for instance a merchant (a service provider), may provide a wireless communication network for use by its patrons (users) where the users may or may not need to provide user credentials for accessing the network. In one example, the network may require a security password, which a user may obtain from the service provider. In another example, a service provider may wish to avoid managing and requiring security passwords by providing an open-access network so that the users may conveniently access the network without a need for a password. However, the coverage of a wireless communication network may extend beyond a physical area where a service provider may intend or wish to provide the service at; for example, a merchant may wish to provide access to his network only to customers who are in the immediate area of his business location. Additionally, the users may have a better user-experience if they can easily access the network without access control and manual login. Therefore, service providers and device manufacturers face significant challenges in providing a more efficient and user friendly access control to location-based services.

SOME EXAMPLE EMBODIMENTS

Therefore, there is a need for a mechanism to determine dynamic information for generating dynamic access tokens to a location-based service.

According to one embodiment, a method comprises determining one or more dynamic information items associated with at least one location in which at least one service is available. The method also comprises determining at least one procedure for generating one or more access tokens associated with the at least one service. The method further comprises processing and/or facilitating a processing of the one or more dynamic information items using, at least in part, the at least one procedure to cause, at least in part, a generation of the one or more access tokens.

According to another embodiment, an apparatus comprises at least one processor, and at least one memory including computer program code, the at least one memory and the computer program code configured to, with the at least one processor, cause, at least in part, the apparatus to determine one or more dynamic information items associated with at least one location in which at least one service is available. The apparatus is also caused to determine at least one procedure for generating one or more access tokens associated with the at least one service. The apparatus is also caused to process and/or facilitate a processing of the one or more dynamic information items using, at least in part, the at least one procedure to cause, at least in part, a generation of the one or more access tokens.

According to another embodiment, a computer-readable storage medium carries one or more sequences of one or more instructions which, when executed by one or more processors, cause, at least in part, an apparatus to determine one or more dynamic information items associated with at least one location in which at least one service is available. The apparatus is also caused to determine at least one procedure for generating one or more access tokens associated with the at least one service. The apparatus is also caused to process and/or facilitate a processing of the one or more dynamic information items using, at least in part, the at least one procedure to cause, at least in part, a generation of the one or more access tokens.

According to another embodiment, an apparatus comprises means for determining one or more dynamic information items associated with at least one location in which at least one service is available. The apparatus also comprises means for determining at least one procedure for generating one or more access tokens associated with the at least one service. The apparatus further comprises means for processing and/or facilitating a processing of the one or more dynamic information items using, at least in part, the at least one procedure to cause, at least in part, a generation of the one or more access tokens.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for a mechanism to determine dynamic information for generating dynamic access tokens to a location-based service. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
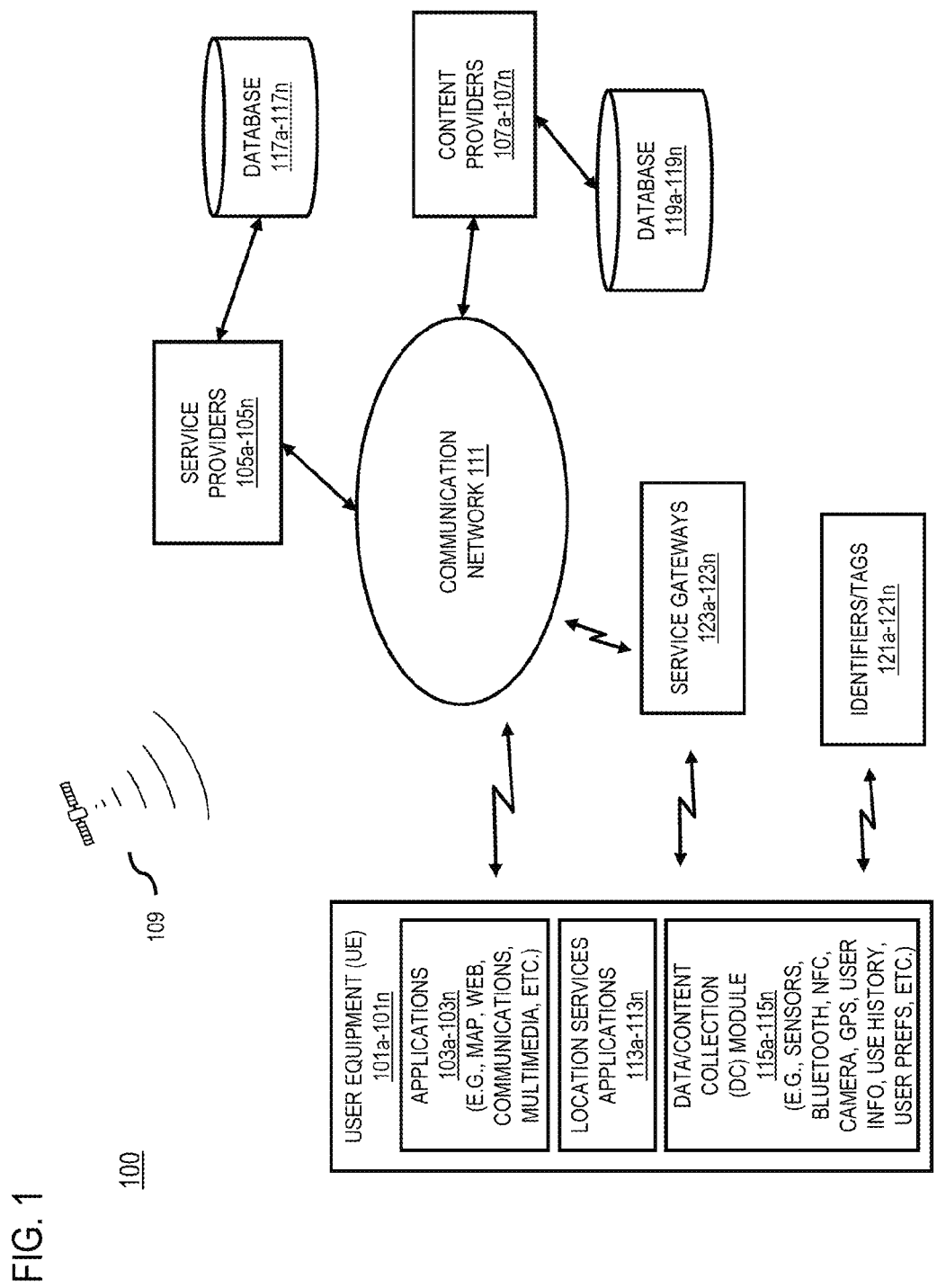
FIG. 1 is a diagram of a system capable of providing for a mechanism to determine dynamic information for generating dynamic access tokens to a location-based service, according to an embodiment.

FIG. 1 is a diagram of a system capable of providing for a mechanism to determine dynamic information for generating dynamic access tokens to a location-based service, according to an embodiment. As user demand for access to various location-based services has been increasing; for example, a desire to frequently access wireless communication networks, many service providers (e.g., merchants) have been accommodating the user demand by providing such services at various points-of-interest (POI) locations. For example, many merchants provide free access to their wireless local area networks (WLAN/WiFi) to customers (users) at their places of business. Additionally, the merchants may use the WLAN to present various information (e.g., coupons/offers) to users already near/at their business location/POI. However, for easy user access and a good user-experience, the service providers may provide an open access to the WLAN, which may also alleviate the issue of password management for the service provider. Nevertheless, at times, a service provider may wish to restrict access to a WLAN only to those users who may be within a certain area of a location/POI so, for example, the WLAN may provide better quality of service (e.g., faster, less user-load, etc.) for the intended users. Further, in certain situations, a service provider may wish to provide the service as an incentive for its customers/users to stay at a POI (e.g., a store, a restaurant, a coffee shop, etc.) near/at the service provider's location. However, as wireless signals can propagate through different surfaces/materials, it would be challenging to control the coverage area of a wireless network service to a desired physical area, wherein other users outside of the desired area may also access and utilize the service thereby causing additional loading/traffic on the network. Therefore, there is a need for a mechanism for service providers and users to determine dynamic information for generating access tokens/passwords to a location-based service.

To address, at least these problems, a system 100 of FIG. 1 introduces the capability of a mechanism to determine dynamic information for generating dynamic access tokens to a location-based service. Generally, when users intent to utilize a service, they may wish for a quick and simple process for accessing the service, for example, when a user utilizes a user device (e.g., a tablet, a mobile phone, etc.) to access a wireless communication service, the user may wish to connect to the service quickly and without too many process steps. Similarly, a service provider may wish to provide the wireless service with reduced management responsibility where a system and a process may quickly authenticate the users for accessing one or more services. As discussed, in certain situations, a proof of presence of a user/device at a certain location/area may be utilized to trigger delivery of certain information or access to services associated with that location/area. However, at times, location information may not be sufficient to provide access to a wireless service since the wireless coverage area may go beyond an area of interest intended to the service provider. For example, a restaurant owner may wish to provide wireless services only to those patrons who are in the restaurant and not in the parking lot area. In one scenario, a user/device may utilize a location information at a POI, various dynamic information associated with that POI location, and one or more procedures to determine/generate one or more passwords or access tokens, which may be submitted to a service provider's system for analysis and authentication. For example, a token may include a unique identifier associated with the service provider site, current interaction session information, information related to the user/device, access privileges, authentication credentials, security information, etc. In one instance, the dynamic information may include location information of a user/device determined by analyzing one or more signals from one or more sources within a certain physical location, information on one or more radio frequency identification (RFID) tags, radio frequency (RF) identifiers, or the like, wherein the signals may be determined/received via one or more RF communication protocols, proximity-based (e.g., Bluetooth®, near field communications (NFC), Bluetooth Low Energy (BLE), Bluetooth Smart®, etc.) or network-based communication channels.

In one embodiment, a user device may determine an access token based on a procedure determined by a service provider who is providing a service, to which the user device is requesting an access. In scenario, a procedure may indicate that an access token is to include dynamic information, for example, location information of the service provider, location of the user device within a marked region (e.g., inside a store), information of one or more RFID tags located within the marked region, time of day, user device type, one or more physiological information items associated with the user of the user device, or the like. In one embodiment, the location of the user device within a marked region (e.g., inside a store) may be determined by receiving and analyzing a plurality of signals from sources available within the marked region. For example, a distance from a radio frequency source may be measured by analyzing reported transmission power at the source and a received signal strength indicator (RSSI) and applying a radio propagation model (e.g., an indoor propagation model.) In one embodiment, various determined dynamic information may be processed by an algorithm at a user device and according to a procedure indicated by a service provider for generating one or more access tokens. In various embodiments, a procedure may be provided/presented to a user/device via one or more messages (e.g., a text message), graphical representations (e.g., barcodes), and the like. In one scenario, a service provider may mark one or more areas/regions of interest by utilizing various RF identifiers and tags, where each area/region may be associated with different or different levels of services.

In one use case scenario, a user enters an area of an establishment (e.g., a restaurant, a coffee shop, a hotel lobby, etc.) where a service provider (merchant) provides a wireless network service. The user may scan a graphical posting (e.g., a barcode), tap an NFC tag, or the like, which may be posted/placed near the entry point, whereby the user device may request/receive (e.g., download) procedures or an application which may be utilized in generating one or more access tokens for accessing the wireless network service. In one scenario, the user device may start scanning the area for RF identifiers and/or the user may be presented (e.g., via a UI) with instructions to go to certain spots in the area so that the user device may to receive one or more dynamic signals and/or information items. In one scenario, an algorithm or an application on the user device may generate one or more access tokens by utilizing the earlier determined procedures and the one or more dynamic signals and/or information items. In one scenario, the user device may present an access request and the one or more access tokens to a device/system associated with the wireless network service, wherein the system may process the access tokens to determine whether or not to grant an access to the user device.

In various embodiments, a service provider may utilize capabilities and benefits of the system 100 to easily manage access control to various location-based services, and users/devices may utilize the capabilities and benefits of the system 100 to determine dynamic information for generating access tokens for accessing the various location-based services.

As shown in FIG. 1, in one embodiment, the system 100 includes user equipment (UE) 101a-101n (also collectively referred to as UE 101 and/or UEs 101), which may be utilized to execute one or more applications 103a-103n (also collectively referred to as applications 103) including social networking, web browser, communications, content sharing, multimedia applications, user interface (UI), map application, web client, etc. to communicate with other UEs 101, one or more service providers 105a-105n (also collectively referred to as service providers 105), one or more content providers 107a-107n (also collectively referred to as content providers 107), one or more GPS satellites 109a-109n (also collectively referred to as GPS satellites 109), one or more identifiers/tags 121a-121n (also collectively referred to as an identifier/identifiers 121), one or more service gateways 123a-123n, and/or with other components of the system 100 directly and/or via communication network 111. In one embodiment, the UEs 101 may include location services applications 113a-113n (also collectively referred to as location service app/apps 113.) In various embodiments, the location service apps 113 may be included in the applications 103 or may be a stand-alone application.

In one embodiment, the UEs 101 may include data/content collection modules 115a-115n (also collectively referred to as DC module 115) for determining and/or collecting data and/or content associated with the UEs 101, one or more users of the UEs 101, applications 103, one or more content items (e.g., multimedia content), and the like. In addition, the UEs 101 can execute an application 103 that is a software client for storing, processing, and/or forwarding one or more information items to other components of the system 100. In various embodiments, the DC module 115 may include various sensors for proximity-based communications, for example, Bluetooth, NFC, RFID, or the like. In one embodiment, an optical sensor (e.g., a camera) on the UE 101 may be utilized to capture an image of a graphical item (e.g., barcodes) for processing by one or more applications and/or modules at the UE 101, wherein the graphical item may include encoded information associated with a POI, a location-based service, a service provider, a procedure for accessing a service, and the like. In one embodiment, the processing of an image of a graphical item may cause one or more actions by the applications 103 and/or one or more modules at the UE 101. For example, based on information determined from a processing of an image (e.g., a barcode), the applications 103 may establish a communication channel with an Internet site of a service provider.

In one embodiment, the location service app 113 may include various algorithms or software programs for processing various dynamic information items according to one or more procedures for generating one or more access tokens, wherein the dynamic information items may also be determined by one or more applications and/or modules at a UE 101. In various embodiments, the dynamic information items may be determined by the DC module 115, the applications 103, various sensors at the UE 101, or the like. For example, a proximity-based communication sensor (e.g., Bluetooth) may receive one or more signals (e.g., RF, optical/light, audio, etc.) from one or more nearby identifiers 121 where the signals may be processed by the location services app 113, the DC module 115, the applications 103, or the like, wherein a location of a user/device may be determined from the processed signals. In one instance, an application and/or an algorithm may determine a distance from an identifier by measuring and analyzing a reported transmission power at the identifier and a received signal strength indicator (RSSI) at the UE 101 and applying a radio propagation model (e.g., an indoor propagation model.) In one example, a plurality of determined distances from a plurality of identifiers in a given space (e.g., in a room) may be utilized to determine spatial location of a user/device in the given space, where the location information may be utilized as proof/indicator that the user/device is located in the room. In one embodiment, the location services app 113 may receive a procedure from the applications 103 and/or from one or more modules at the UE 101. In one embodiment, the location service app 113 may determine a procedure via one or more messages/notifications (e.g., short message service (SMS), email, etc.), which may be requested and/or received from a POI services, navigation services, search engines, or other service providers. In various embodiments, a location service app 113 may be specific to one or more locations, regions, service providers, operating systems, device types, or the like. In one embodiment, a location service app 113 may be utilized by any UE 101 at any location for any services. In one embodiment, the location service app 113 may be preloaded onto a UE 101 by a service provider or a device manufacturer, or it may be downloaded by a user or an application at a UE 101. In various embodiments, the location services app 113 may directly communicate an access token to a service gateway 123 or may present the access token to the applications 103 and/or one or more modules at the UE 101 so that the token may be communicated to the service gateway 123.

In one embodiment, the service providers 105 may include and/or have access to one or more databases 117a-117n (also collectively referred to as database 117), which may include various user information, user profiles, user preferences, one or more profiles of one or more user devices (e.g., device configuration, sensors information, etc.), service providers 105 information, other service providers' information, and the like. In one embodiment, the service providers 105 may include one or more service providers offering one or more services, for example, online shopping, social networking services (e.g., blogging), content sharing, media upload, media download, media streaming, account management services, or a combination thereof. Further, the service providers 105 may conduct a search for content items, media items, information, coupons, and the like associated with one or more users, POIs, geo-locations, and the like.

In one embodiment, the content providers 107 may include and/or have access to one or more database 119a-119n (also collectively referred to as database 119), which may store, include, and/or have access to various content items. For example, the content providers 107 may store content items (e.g., at the database 119) provided by various users, various service providers, crowd-sourced content, and the like. Further, the service providers 105 and/or the content providers 107 may utilize one or more service application programming interfaces (APIs)/integrated interface, through which communication, media, content, and information (e.g., associated with users, applications, services, content, etc.) may be shared, accessed and/or processed.

In various embodiments, the identifiers/tags 121 may include one or more signal sources, which may be placed within a spatial area, for example, on the walls, floor, ceiling, and any structures in a room/space as applicable. For example, a signal source may include RF, light/optical, audio, or the like sources, which may be transmitting/presenting one or more signals including a default signal and/or one or more information items encoded into the signal. For example, a signal may include ID information of an identifier/source-device, location information of the identifier, transmission signal power at the identifier, and other information items which may be associated with a POI location, a service provider, or the like. In one embodiment, an identifier may be or may include an RFID memory tag, which may transmit/present ID and location information of the memory tag, and other information items which may be associated with a POI location, a service provider, or the like, wherein a memory tag may be active or passive.

In various embodiments, a service gateway 123 may include hardware, software, firmware, and the like that may be utilized by users to access a LAN/WLAN and initiate a network connection, for example, to the communication network 111. A service gateway 123 may include an authentication module, which may contain authentication access tokens/keys for authenticating or authorizing the users requesting access to the network. A service gateway 123 may provide a wireless Internet protocol (IP) connectivity authentication between a UE 101 and a communication network. In one embodiment, a service gateway 123 may provide one or more procedures to a UE 101, which the UE 101 may utilize in generating one or more access tokens. For example, the service gateway 123 may provide a procedure via a communication channel that does not require any authentication between a UE 101 and the gateway 123.

In one embodiment, the system 100 determines one or more dynamic information items associated with at least one location in which at least one service is available. In one embodiment, a location services app 113 on a UE 101 may determine the various dynamic information items, wherein the dynamic information items may include, at least in part, signal strength information from one or more identifiers associated with at least one geographical boundary of the at least one location, the at least one service, or a combination thereof. For example, the dynamic information may be determined by the DC module 115, which may be processed and/or utilized by the applications 103 and/or the location services app 113. In one embodiment, the dynamic information may indicate spatial location and/or movement of a user/device within a certain area; for example, the user may be at a certain point/position in a room or may be moving around. In one embodiment, the at least one service includes a wireless communication network service. For example, a service provider at an establishment (e.g., a merchant) may provide a WLAN service to its visitors/customers located within a certain physical area in relation to the establishment and/or a POI defined by the service provider. In one embodiment, the dynamic information may include various information items associated with a user and/or a user device, for example, user history, user preferences, user device type, applications available at the user device, physiological information of the user, or the like.

In one embodiment, the system 100 determines at least one procedure for generating one or more access tokens associated with the at least one service. In one embodiment, the at least one procedure, the one or more dynamic information items, or a combination thereof is determined via a proximity-based communication channel, a network-based communication channel, a graphical representation, or a combination thereof. For example, the location services app 113 may receive a procedure from the applications 103 and/or from one or more modules at the UE 101. In one embodiment, the location service app 113 may determine a procedure via one or more messages/notifications (e.g., short message service (SMS), email, etc.), which may be requested and/or received from a POI services, navigation services, search engines, or other service providers. In one embodiment, a user may utilize the UE 101 to capture an image of a graphical representation (e.g., a barcode, an application name, etc.), which may include encoded information on the procedure and/or on how to obtain the procedure. In one embodiment, a user may use a UE 101 to interface with a memory tag, for example via NFC, for retrieving the procedure and/or information associated with the procedure.

In one embodiment, the system 100 processes and/or facilitates a processing of the one or more dynamic information items using, at least in part, the at least one procedure to cause, at least in part, a generation of the one or more access tokens. In one embodiment, the location services application 113 may utilize one or more algorithms, software programs, or the like to process the determined dynamic information for generating the one or more access tokens. For example, the procedure may include process steps for the algorithm to use the dynamic information and calculate one or more alphanumeric, graphical, barcode, or the like access tokens. In one instance, the procedure may indicate that the dynamic data should be added, subtracted, divided, multiplied, truncated, expanded, or the like operations by the one or more algorithms in certain order.

In one embodiment, the system 100 processes and/or facilitates a processing of the radio frequency signal information to determine at least one user location with respect to the at least one geographical boundary. In one embodiment, an application and/or an algorithm may determine a distance from a given identifier by measuring and analyzing a reported transmission power at the identifier and a received signal strength indicator (RSSI) at the UE 101, and further apply a radio propagation model (e.g., an indoor propagation model.) In one example, a plurality of determined distances from a plurality of identifiers in a given space (e.g., in a room) may be utilized to determine spatial location of a user/device in the given space, where the location information may be utilized as proof/indicator that the user/device is located in the room. In one embodiment, the generation of the one or more access tokens is based, at least in part, on the at least one user location. In one instance, a procedure may indicate that location information of a user/device within a certain area is to be used when calculating an access token, wherein the location information may allow for a generation of a valid access token. For example, an access token may be valid if a user location is determined to be inside a certain coffee shop area.

In one embodiment, the system 100 causes, at least in part, a presentation of one or more notifications with respect to an availability of the at least one service, the one or more access tokens, or a combination thereof based, at least in part, on the at least one user location. In one embodiment, the location services app 113 and/or the applications 103 may cause a presentation of one or more notifications to the user, via a UI on the UE 101, which may indicate an availability of one or more services. In one embodiment, the one or more notifications may indicate availability of one or more access tokens, or a need to generate one or more access tokens, or the like, information which may be associated with the one or more services. In one embodiment, the notifications may indicate information associated with a physical area and one or more services, which may be available in the physical area.

In one embodiment, the system 100 causes, at least in part, an updating to the one or more access tokens based, at least in part, on one or more changes in the one or more dynamic information items, in the at least one procedure, or a combination thereof, wherein the updating is prior to an expiration of a current access token. In one embodiment, the location services app 113 may determine one or more changes in the one or more dynamic information items, for example, a spatial location of a user in a given area may have changed. For example, a user may have moved from inside a coffee shop area to a patio area of the coffee shop, where the location services app 113 and/or the service gateway 123 may determine that the one or more access tokens may need to be updated. In one embodiment, an access token may be updated before a current access token expires, which may allow a currently utilized service to continue without any significant interruption to the service.

In one embodiment, the system 100 determines one or more attributes associated with a user, a user device, or a combination thereof that is requesting an access to the at least one service. In one embodiment, the location services app 113 may determine the one or more attributes and/or information items associated with a user and/or a user device and/or it may request/retrieve the attributes and/or the information from the applications 103 or one or more module at the UE 101. In various embodiments, the attributes may include a user history, user preferences, user device type, applications available at the user device, physiological information of the user, or the like.

In one embodiment, the system 100 causes, at least in part, the generating of the one or more access tokens based, at least in part, on the one or more attributes. In one embodiment, the location services app 113 may utilize the attributes and/or the information items in generating and/or updating the one or more access tokens. For example, a user may utilize a UE 101*a* to access an available service and later, the user may switch to a UE 101*b* device, where the one or more access tokens would be updated based on the UE 101*b* and/or user profile information associated with the UE 101*b*.

In one embodiment, the system 100 determines the at least one procedure, the one or more dynamic information items, or a combination thereof based, at least in part, on one or more transactions performed at the at least one location. In one scenario, a user may utilize a UE 101 to conduct one or more transactions with a point-of-service (POS) device/system at a service provider/POI where there may be a location-based service. For example, a user may be using a UE 101 to interface with the POS device and pay for the purchase of some coffee at a coffee shop where the coffee shop provides a wireless service for its customers. Further, during the transaction, the POS device may provide to the UE 101 one or more dynamic information items and/or one or more procedures, which the location services app 113, the applications 103, or the like may utilize in generating one or more access tokens for the available wireless service at the coffee shop. In various examples, the transaction may be via NFC, Bluetooth, or the like.

The UEs 101 may be any type of mobile terminal, fixed terminal, or portable terminal including a mobile handset, station, unit, device, healthcare diagnostic and testing devices, product testing devices, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, loud speakers, display monitors, radio broadcast receiver, electronic book device, game device, wrist watch, or any combination thereof, including the accessories and peripherals of these devices, or any combination thereof. It is also contemplated that the UEs can support any type of interface to the user (such as "wearable" circuitry, etc.) Further, the UEs 101 may include various sensors for collecting data associated with a user, a user's environment, and/or with a UE 101, for example, the sensors may determine and/or capture audio, video, images, atmospheric conditions, device location, user mood, ambient lighting, user physiological information, device movement speed and direction, and the like.

In one embodiment, the UE 101 includes a location module/sensor that can determine the UE 101 location (e.g., a user's location). The UE 101 location may be determined by a triangulation system such as a GPS, assisted GPS (A-GPS), Cell of Origin, wireless local area network triangulation, or other location extrapolation technologies. Standard GPS and A-GPS systems can use the one or more satellites 109 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module/sensor may also utilize multiple technologies to detect the location of the UE 101. GPS coordinates can provide finer detail as to the location of the UE 101. In another embodiment, the UE 101 may utilize a local area network (e.g., LAN, WLAN) connection to determine the UE 101 location information, for example, from an Internet source (e.g., a service provider).

By way of example, the communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101, the service providers 105, the content providers 107, and the service gateways 123 may communicate with each other and other components of the communication network 111 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the UEs 101, the service providers 105, and the service gateways 123 may interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. It is also noted that the role of a client and a server is not fixed; in some situations a device may act both as a client and a server, which may be done simultaneously and/or the device may alternate between these roles.

Figure 2:
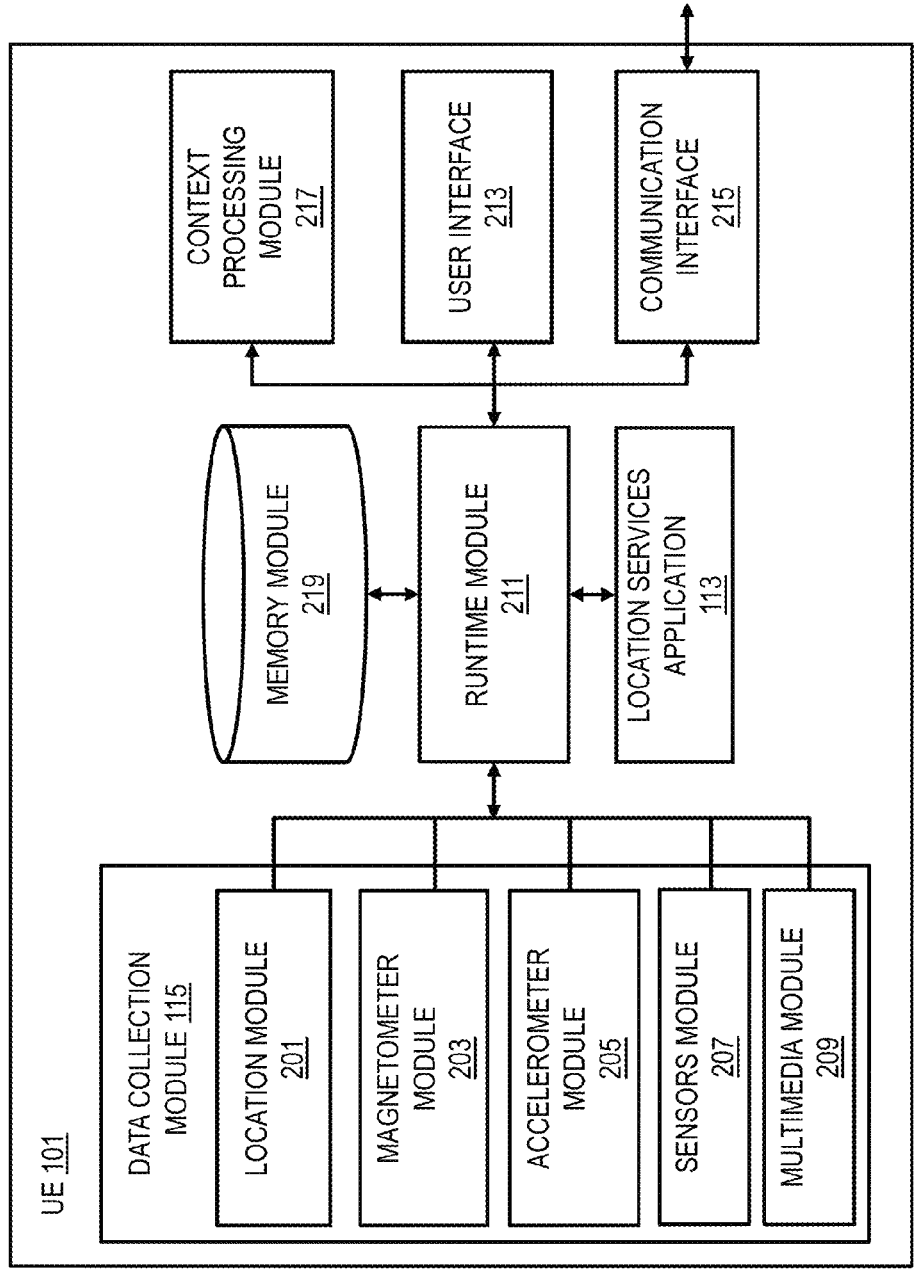
FIG. 2 is a diagram of the components of a user equipment capable of determining dynamic information for generating dynamic access tokens to a location-based service, according to an embodiment.

FIG. 2 is a diagram of the components of a user equipment capable of determining dynamic information for generating dynamic access tokens to a location-based service, according to an embodiment. By way of example, a UE 101 includes one or more components for determining dynamic information for generating dynamic access tokens to a location-based service. It is contemplated that the functions of these components may be combined in one or more components or performed by other components of equivalent functionality. In this embodiment, the UE 101 includes a DC module 115 that may include one or more location modules 201, magnetometer modules 203, accelerometer modules 205, sensors module 207, and multimedia module 209. Further, the UE 101 may also include a runtime module 211 to coordinate the use of other components of the UE 101, the location services application 113, a user interface 213, a communication interface 215, a context processing module 217, and a memory module 219. The applications 103 of the UE 101 can execute on the runtime module 211 utilizing the components of the UE 101.

The location module 201 can determine a user's location, for example, via location of a UE 101. The user's location can be determined by a triangulation system such as GPS, assisted GPS (A-GPS), Cell of Origin, or other location extrapolation technologies. Standard GPS and A-GPS systems can use satellites 109 to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 201 may also utilize multiple technologies to detect the location of the UE 101. Location coordinates (e.g., GPS coordinates) can give finer detail as to the location of the UE 101 when media is captured. In one embodiment, GPS coordinates are stored as context information in the memory module 219 and are available to the context processing module 217, the DC module 115, the service providers 105, and/or to other entities of the system 100 (e.g., via the communication interface 215.) Moreover, in certain embodiments, the GPS coordinates can include an altitude to provide a height. In other embodiments, the altitude can be determined using another type of altimeter. In certain embodiments, the location module 201 can be a means for determining a location of the UE 101, an image, or used to associate an object in view with a location.

The magnetometer module 203 can be used in finding horizontal orientation of the UE 101. A magnetometer is an instrument that can measure the strength and/or direction of a magnetic field. Using the same approach as a compass, the magnetometer is capable of determining the direction of a UE 101 using the magnetic field of the Earth. The front of a media capture device (e.g., a camera) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer can be stored in memory module 219, made available to other modules and/or applications 103 of the UE 101, and/or transmitted via the communication interface 215 to one or more entities of the system 100.

The accelerometer module 205 can be used to determine vertical orientation of the UE 101. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 205 can determine the angle the UE 101 is pointed as compared to Earth's gravity. In certain embodiments, the magnetometer module 203 and accelerometer module 205 can be means for ascertaining a perspective of a user. This perspective information may be stored in the memory module 219, made available to other modules and/or applications 103 of the UE 101, and/or sent to one or more entities of the system 100.

In various embodiments, the sensors module 207 can process sensor data from various sensors (e.g., Bluetooth, NFC, GPS, accelerometer, gyroscope, thermometer, etc.) to determine environmental (e.g., atmospheric) conditions surrounding the UE 101, user mood (e.g., hungry, angry, tired, etc.), location information, and various other information from a range sensors that may be available on one or more devices. For example, the sensors module 207 may detect conditions including humidity, temperature, geo-location, biometric data of the user, etc. Once again, this information can be stored in the memory module 219 and sent to the context processing module 217 and/or to other entities of the system 100. In certain embodiments, information collected from the DC collection module 115 can be retrieved by the runtime module 211 and stored in memory module 219, made available to other modules and/or applications 103 of the UE 101, and/or sent to one or more entities of the system 100.

In one embodiment, the multimedia module 209 may be utilized to capture various media items, for example, images, video, audio, and the like, wherein the captured media may be submitted to one or more modules and applications of the UE 101, a service provider, and/or a content provider to further processing, storage, sharing, and the like. In various embodiments, the captured media may be shared with a content sharing module, application, etc. for sharing with one or more other devices. In various embodiments, the multimedia module 209 may interface with various sensors; for example, a camera, a microphone, etc., to capture the media items at a UE 101.

In one embodiment, the communication interface 215 can be used to communicate with one or more entities of the system 100. In various embodiments, the communication interface 215 may facilitate communications via one or more wireless communication channels and protocols, for example, WLAN, RFID, NFC, Bluetooth Smart, Bluetooth, Ant+, Z-Wave, ZigBee, or the like, wherein the communication channels may be established via one or more sensors, transceivers, transmitters, receivers, wireless charging interface, or the like. Certain communications can be via methods such as an internet protocol, messaging (e.g., SMS, multimedia messaging service (MMS), etc.), or any other communication method (e.g., via the communication network 111). In some examples, the UE 101 can send context information associated with the UE 101 to the service providers 105, content providers 107, and/or to other entities of the system 100.

The user interface 213 can include various methods of for a user to interface with applications, modules, sensors, and the like at a UE 101. For example, the user interface 213 can have outputs including a visual component (e.g., a screen), an audio component, a physical component (e.g., vibrations), and other methods of communication. User inputs can include a touch-screen interface, a scroll-and-click interface, a button interface, a microphone, etc. Input can be via one or more methods such as voice input, textual input, typed input, typed touch-screen input, other touch-enabled input, etc.

The context processing module 217 may be utilized in determining context information from the location services application 113, DC module 115 and/or applications 103 executing on the runtime module 211. This information may be caused to be transmitted, via the communication interface 215, to the service providers 105 and/or to other entities of the system 100. The context processing module 217 may additionally be utilized as a means for determining information related to the user, an instance of data, a value, a content item, an object, a subject, and the like. In certain embodiments, the context processing module 217 can infer higher level context information from the context data such as favorite locations, significant places, common activities, interests in products and services, POIs at various geo-locations, etc.

In various embodiments, the runtime module may cause one or more modules/components of a UE 101 to associate one or more available data items with one or more content items available from the one or more modules/components of the UE 101. For example, date, time, location, and user information associated with a device at a particular time may be associated (e.g., as metadata) with an image that is captured by the UE 101 at that particular time.

Figure 3:
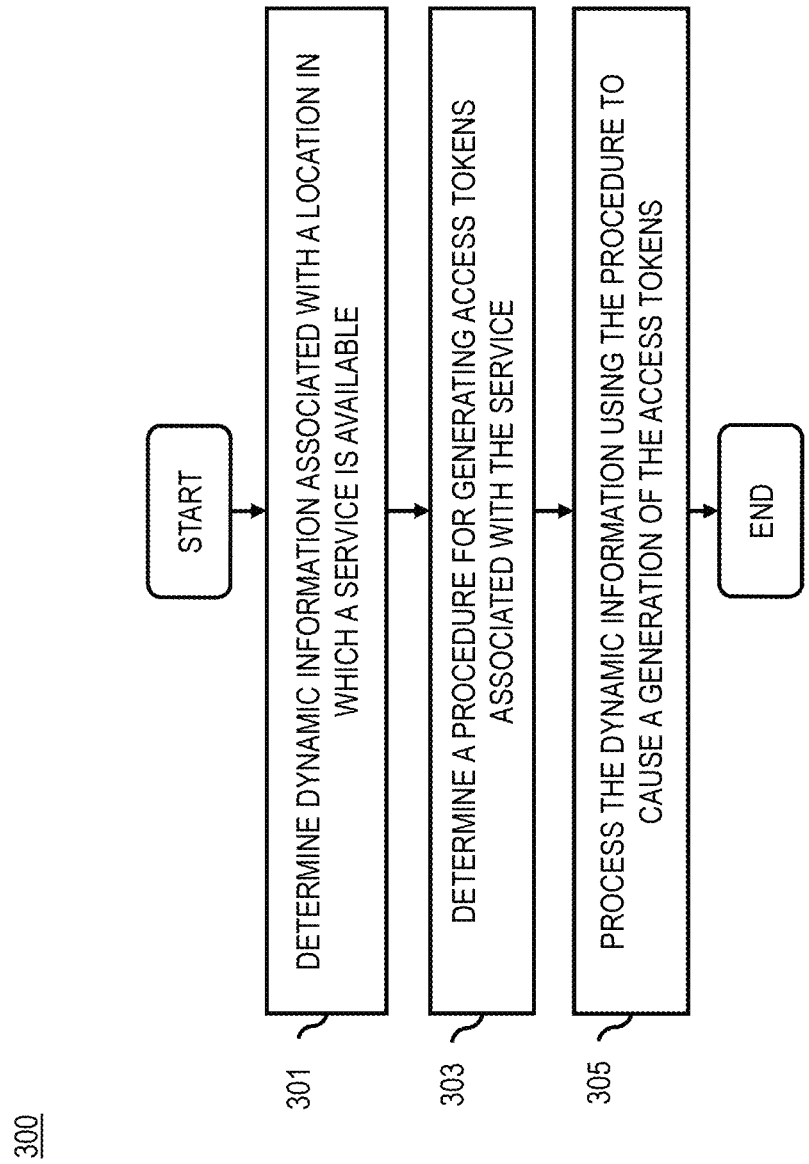
FIGS. 3 and 4 illustrate flowcharts of various processes for, at least, determining dynamic information for generating dynamic access tokens to a location-based service, according to various embodiments.
Figure 4:
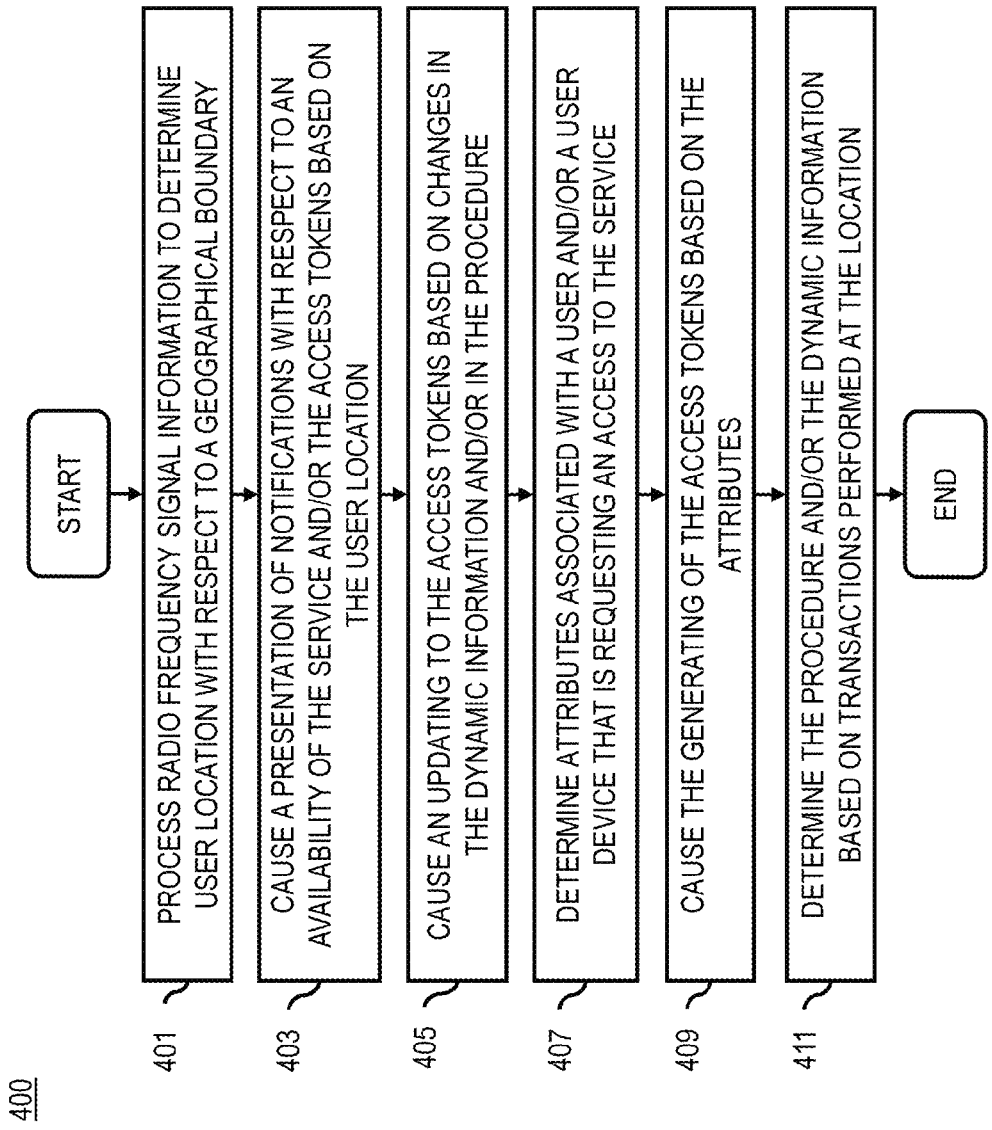
Figure 10:
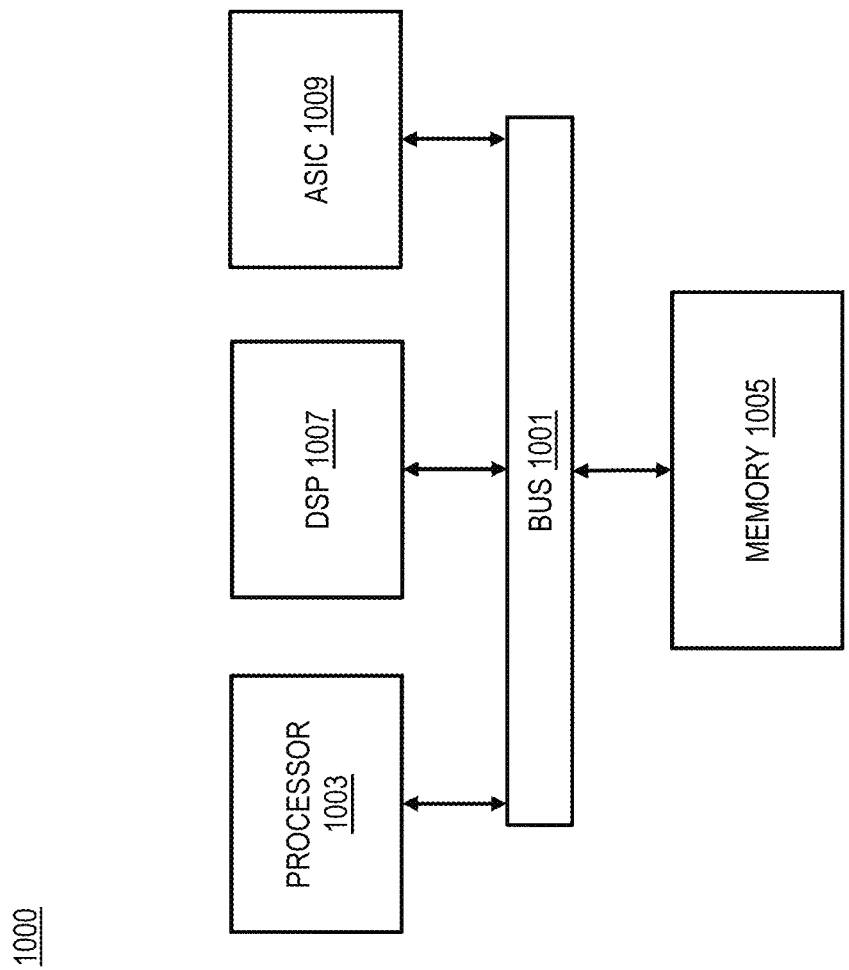
FIG. 10 is a diagram of a chip set that can be used to implement an embodiment of the invention.

FIGS. 3 and 4 illustrate flowcharts of various processes for, at least, determining dynamic information for generating dynamic access tokens to a location-based service, according to various embodiments. In various embodiments, the location service app 113 may perform processes 300 and 400 that may be implemented, for instance, in a chip set including a processor and a memory as shown in FIG. 10. As such, the location service app 113 can provide means for accomplishing various parts of the process 300 and 400 as well as means for accomplishing other processes in conjunction with other components of the system 100. Throughout this process, the location service app 113 may be referred to as completing various portions of the processes 300 and 400, however, it is understood that other components of the system 100 can perform some of and/or all of the process steps. Further, in various embodiments, the location service app 113 may be implemented in one or more entities of the system 100.

Referring to FIG. 3, the process 300 begins at step 301 where the location service app 113 may determine one or more dynamic information items associated with at least one location in which at least one service is available. In one embodiment, a location services app 113 on a UE 101 may determine the various dynamic information items, wherein the dynamic information items may include, at least in part, signal strength information from one or more identifiers associated with at least one geographical boundary of the at least one location, the at least one service, or a combination thereof. For example, the dynamic information may be determined by the DC module 115, which may be processed and/or utilized by the applications 103 and/or the location services app 113. In one embodiment, the dynamic information may indicate spatial location and/or movement of a user/device within a certain area, for example, the user may be at a certain point/position in a room or may be moving around. In one embodiment, the at least one service includes a wireless communication network service. For example, a service provider at an establishment (e.g., a merchant) may provide a WLAN service to its visitors/customers located within a certain physical area in relation to the establishment and/or a POI defined by the service provider. In one embodiment, the dynamic information may include various information items associated with a user and/or a user device, for example, user history, user preferences, user device type, applications available at the user device, physiological information of the user, or the like.

In step 303, the location service app 113 may determine at least one procedure for generating one or more access tokens associated with the at least one service. In one embodiment, the at least one procedure, the one or more dynamic information items, or a combination thereof is determined via a proximity-based communication channel, a network-based communication channel, a graphical representation, or a combination thereof. For example, the location services app 113 may receive a procedure from the applications 103 and/or from one or more modules at the UE 101. In one embodiment, the location service app 113 may determine a procedure via one or more messages/notifications (e.g., short message service (SMS), email, etc.), which may be requested and/or received from a POI services, navigation services, search engines, or other service providers. In one embodiment, a user may utilize the UE 101 to capture an image of a graphical representation (e.g., a barcode, an application name, etc.), which may include encoded information on the procedure and/or on how to obtain the procedure. In one embodiment, a user may use a UE 101 to interface with a memory tag, for example via NFC, for retrieving the procedure and/or information associated with the procedure.

In step 305, the location service app 113 may process and/or facilitate a processing of the one or more dynamic information items using, at least in part, the at least one procedure to cause, at least in part, a generation of the one or more access tokens. In one embodiment, the location services application 113 may utilize one or more algorithms, software programs, or the like to process the determined dynamic information for generating the one or more access tokens. For example, the procedure may include process steps for the algorithm to use the dynamic information and calculate one or more alphanumeric, graphical, barcode, or the like access tokens. In one instance, the procedure may indicate that the dynamic data should be added, subtracted, divided, multiplied, truncated, expanded, or the like operations by the one or more algorithms in certain order.

Referring to FIG. 4, the process 400 begins at step 401 where the location service app 113 may process and/or facilitate a processing of the radio frequency signal information to determine at least one user location with respect to the at least one geographical boundary. In one embodiment, an application and/or an algorithm may determine a distance from a given identifier by measuring and analyzing a reported transmission power at the identifier and a received signal strength indicator (RSSI) at the UE 101, and further apply a radio propagation model (e.g., an indoor propagation model.) In one example, a plurality of determined distances from a plurality of identifiers in a given space (e.g., in a room) may be utilized to determine spatial location of a user/device in the given space, where the location information may be utilized as proof/indicator that the user/device is located in the room. In one embodiment, the generation of the one or more access tokens is based, at least in part, on the at least one user location. In one instance, a procedure may indicate that location information of a user/device within a certain area is to be used when calculating an access token, wherein the location information may allow for a generation of a valid access token. For example, an access token may be valid if a user location is determined to be inside a certain coffee shop area.

In step 403, the location service app 113 may cause, at least in part, a presentation of one or more notifications with respect to an availability of the at least one service, the one or more access tokens, or a combination thereof based, at least in part, on the at least one user location. In one embodiment, the location services app 113 and/or the applications 103 may cause a presentation of one or more notifications to the user, via a UI on the UE 101, which may indicate an availability of one or more services. In one embodiment, the one or more notifications may indicate availability of one or more access tokens, or a need to generate one or more access tokens, or the like, information which may be associated with the one or more services. In one embodiment, the notifications may indicate information associated with a physical area and one or more services, which may be available in the physical area.

In step 405, the location service app 113 may cause, at least in part, an updating to the one or more access tokens based, at least in part, on one or more changes in the one or more dynamic information items, in the at least one procedure, or a combination thereof, wherein the updating is prior to an expiration of a current access token. In one embodiment, the location services app 113 may determine one or more changes in the one or more dynamic information items, for example, a spatial location of a user in a given area may have changed. For example, a user may have moved from inside a coffee shop area to a patio area of the coffee shop, where the location services app 113 and/or the service gateway 123 may determine that the one or more access tokens may need to be updated. In one embodiment, an access token may be updated before a current access token expires, which may allow a currently utilized service to continue without any significant interruption to the service.

In step 407 the location service app 113 may determine one or more attributes associated with a user, a user device, or a combination thereof that is requesting an access to the at least one service. In one embodiment, the location services app 113 may determine the one or more attributes and/or information items associated with a user and/or a user device and/or it may request/retrieve the attributes and/or the information from the applications 103 or one or more module at the UE 101. In various embodiments, the attributes may include a user history, user preferences, user device type, applications available at the user device, physiological information of the user, or the like.

In step 409, the location service app 113 may cause, at least in part, the generating of the one or more access tokens based, at least in part, on the one or more attributes. In one embodiment, the location services app 113 may utilize the attributes and/or the information items in generating and/or updating the one or more access tokens. For example, a user may utilize a UE 101a to access an available service and later, the user may switch to a UE 101b device, where the one or more access tokens would be updated based on the UE 101b and/or user profile information associated with the UE 101b.

In step 411, the location service app 113 may determine the at least one procedure, the one or more dynamic information items, or a combination thereof based, at least in part, on one or more transactions performed at the at least one location. In one scenario, a user may utilize a UE 101 to conduct one or more transactions with a point-of-service (POS) device/system at a service provider/POI where there may be a location-based service. For example, a user may be using a UE 101 to interface with the POS device and pay for the purchase of some coffee at a coffee shop where the coffee shop provides a wireless service for its customers. Further, during the transaction, the POS device may provide to the UE 101 one or more dynamic information items and/or one or more procedures, which the location services app 113, the applications 103, or the like may utilize in generating one or more access tokens for the available wireless service at the coffee shop. In various examples, the transaction may be via NFC, Bluetooth, or the like.

Figure 5:
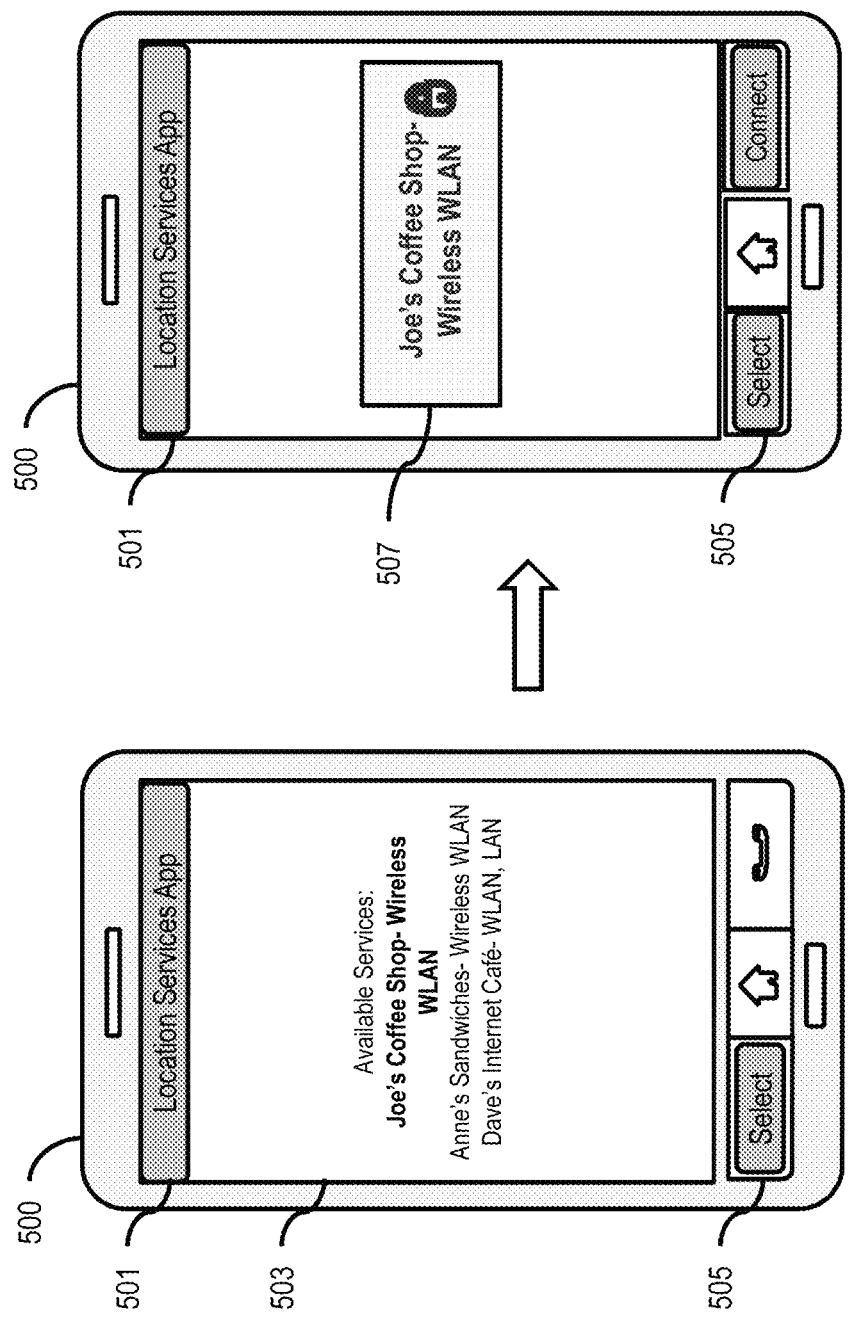
FIG. 5 illustrates example user interface on a user device for accessing location-based services, according to an embodiments.

FIG. 5 illustrates example user interface on a user device for accessing location-based services, according to an embodiment. In one scenario, a user may utilize a location services app 501 on a user device 500 (e.g., UE 101) to discover one or more services 503, which may be available from one or more service providers, for example, WLAN services made available by various merchants near a POI where the user may select different options from various UI features 505. In one use case scenario, the user may select a service 507 from the one or more of services 503 and choose from the options 505 to connect/access the service 507, which may require one or more passwords, passcodes, access tokens, or the like for providing access to the service 507.

Figure 6:
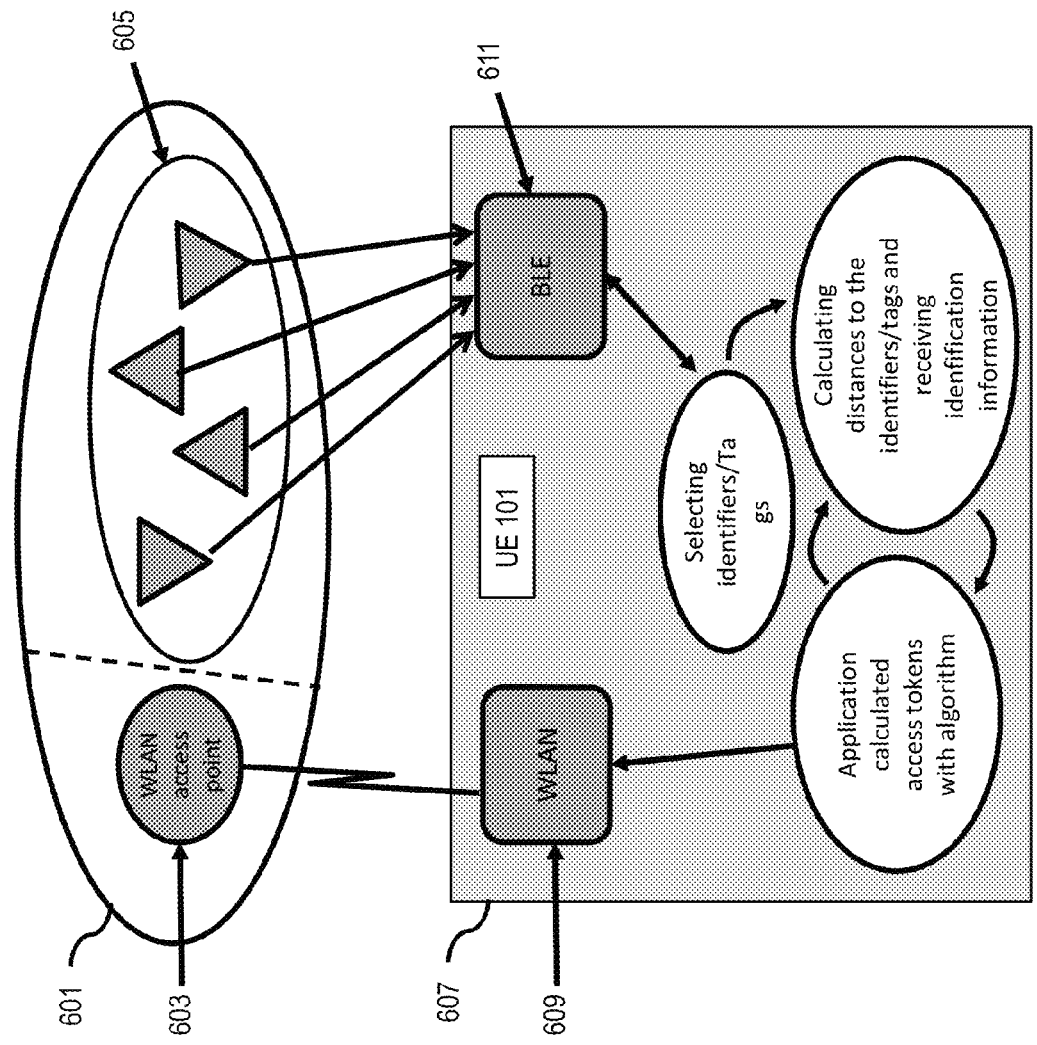
FIGS. 6 through 8 show example process interactions between a point of service and a user device for accessing location-based services, according to various embodiments.
Figure 7:
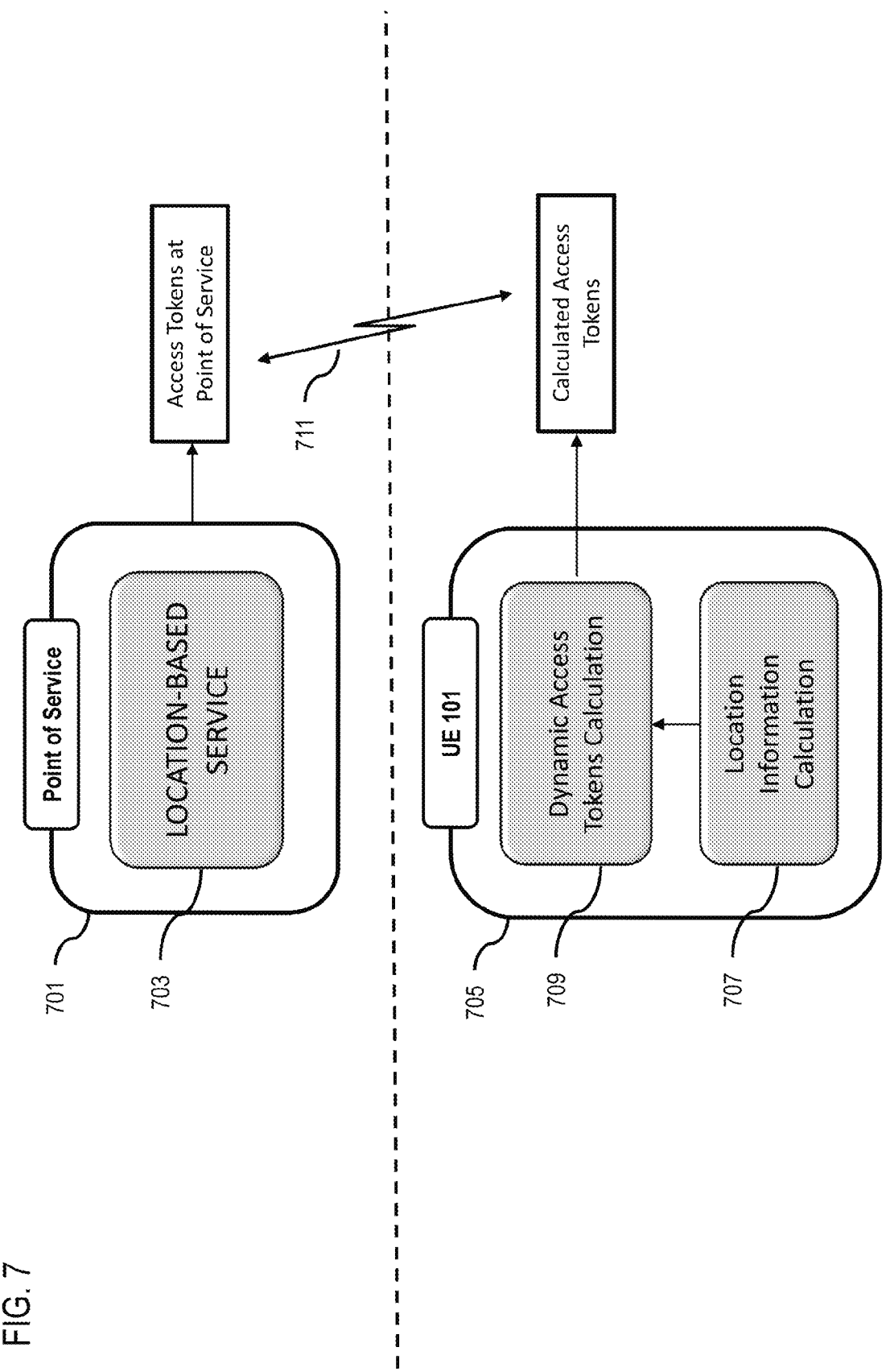
Figure 8:
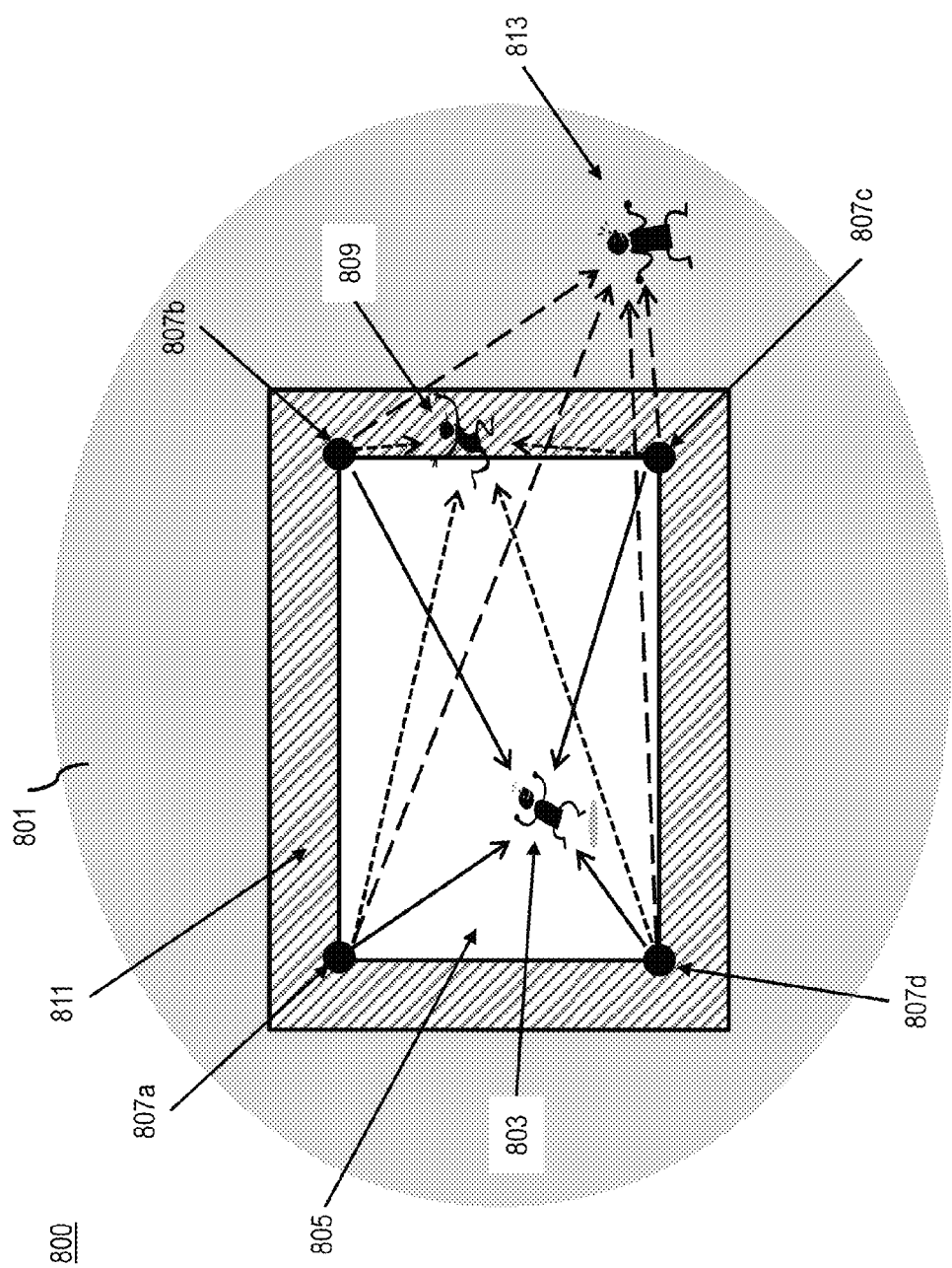

FIGS. 6 through 8 show example process interactions between a point of service and a user device for accessing location-based services, according to various embodiments.

FIG. 6 includes a POS 601 which may be associated with a service provider location/POI. In one embodiment, the POS 601 may provide one or more services, for example, a WLAN access point 603. Further, the POS 601 may include a plurality of identifiers/tags 605, which may be located at various locations in the POS 601. Further, a user device 607 (e.g., a UE 101) may be utilized to discover and request access to the service 603 via one or more applications and/or modules, for example, a WLAN module 609. Further, one or more sensors and applications at the user device 607, for example, one or more proximity-based sensors 611, e.g., Bluetooth-low-energy (BLE) sensors, RFID, NFC, or the like. In one embodiment, a location services app 113 may utilize the information determined from the identifiers 605 to determine spatial location information of a UE 101 with reference to a physical area, for example, in a coffee shop. Further, the location services app 113 may calculate one or more access tokens based on one or more procedures and algorithms where the one or more access tokens may be presented to the WLAN service 603 for authentication and access to the service 603. In one embodiment, the WLAN access point 603 and the identifiers 605 in the POS 601 are not necessarily coupled, for example, they do not share direct communication channels.

FIG. 7 illustrates a POS 701, which may include a location-based service 703. In one embodiment, a service provider of POS 701 may determine, control, and associate various passwords, passcodes, access tokens, and the like with the service 703. For example, the access tokens may be determined based, at least in part, on a password by the service provider, location of the identifiers/tags, and/or an information/ID list of available identifiers/tags in the POS 701 physical area. Further, a user device 705 may be utilized for accessing the service 703, where the user device 705 may determine various information items 707 for calculating one or more dynamic access tokens 709. For instance, the information items 707 may include a memory tag ID, a MAC address, device ID, and the like. Further, the dynamic access tokens may be calculated based, at least, on a service provider password, geometry and identifier/tag positions. For example, the access tokens may be calculated based on one or more procedures and algorithms where the procedures may be provided by the POS 701 and the algorithm may be included in the location services app 113 and/or the applications 103. Further, the UE 101 may present the access tokens to the POS 701 via one or more communication channels 711 for authentication and access to the service 703.

FIG. 8 illustrates a coverage area for a location-based service. In one use case scenario, a location-based service 800 may be associated with a service provider (e.g., a coffee shop merchant) and include a wireless network service with a coverage area 801. In one instance, the service provider may wish to limit access to the service 800 to users/customers 803 who may be located in certain areas associated with the service provider, for example, inside a target area 805 (e.g., in the coffee shop.) In one embodiment, a user device of the user 803 may discover and interact/communicate with a plurality of identifiers/tags 807a-807d for determining spatial location information of the user 803. For example, the identifiers/tags 807a-807d may include signal sources using Bluetooth, RFID tags, smart tags, optical sources, or the like. In one embodiment, a graphical representation of the target area 805 may be presented to a user via a UI on a UE 101. In one embodiment, the system 100 may determine if a user 809 is in or outside of the target area 803 where the user may be presented with notification that the user is in an area 811, for example a warning area, which may be outside of the target area 803 (e.g., boundaries) where the service 800 is provided. In one embodiment, if location of a user 813 is determined to be outside of the target area 803 and 811 (e.g., but still within the coverage area 801), then access tokens generated based on the location information of the user 813 may not be valid for accessing the service 800.

The processes described herein for a mechanism to determine dynamic information for generating dynamic access tokens to a location-based service may be advantageously implemented via software, hardware, firmware, or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
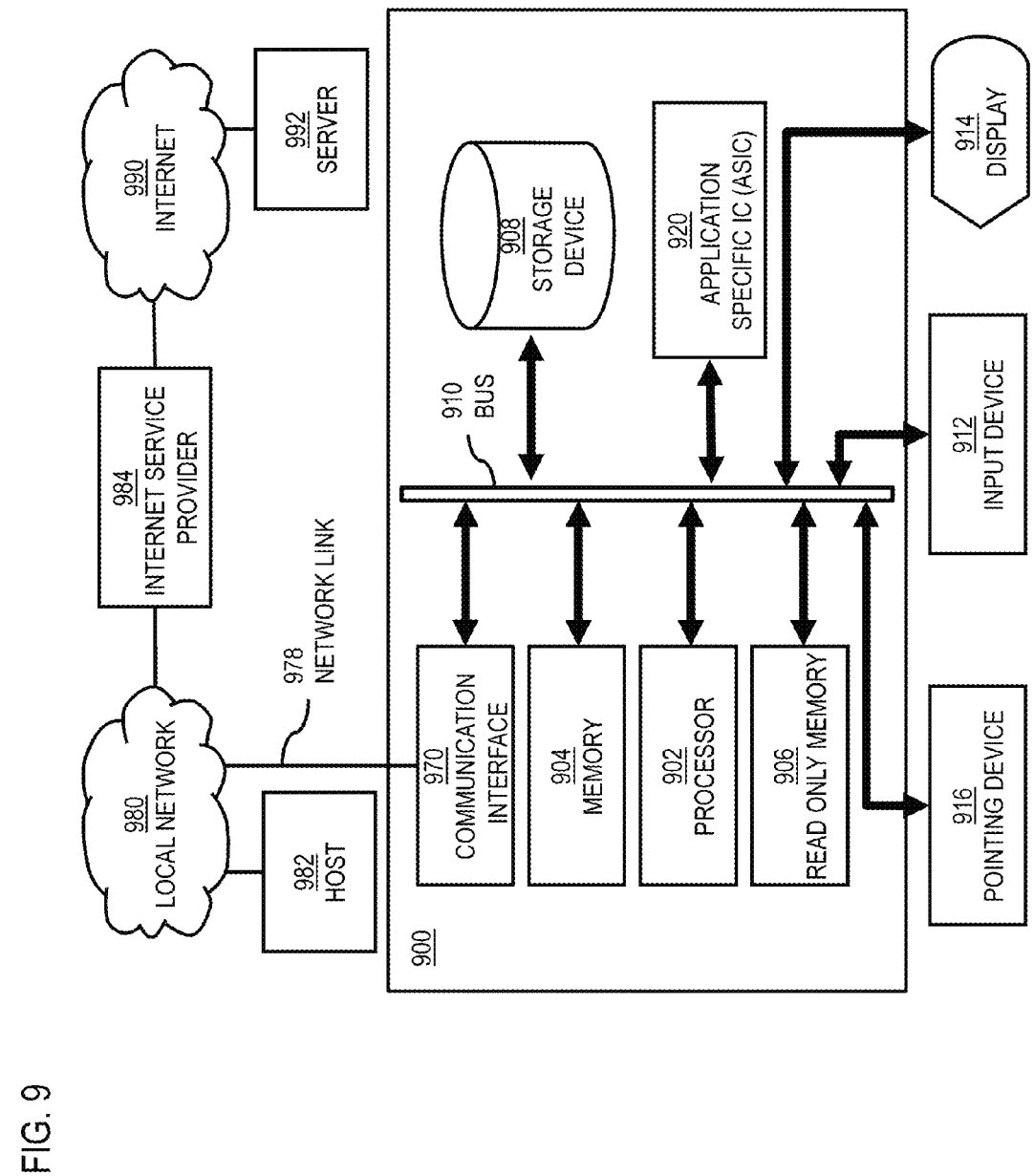
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) for a mechanism to determine dynamic information for generating dynamic access tokens to a location-based service to as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps for a mechanism to determine dynamic information for generating dynamic access tokens to a location-based service.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to a more efficient and user friendly mechanism for sharing content among users. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for a mechanism to determine dynamic information for generating dynamic access tokens to a location-based service. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for a mechanism to determine dynamic information for generating dynamic access tokens to a location-based service, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914, and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners, and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic, or electromagnetic signals, including infrared and optical signals that carry information streams, such as digital data. For example, in wireless devices, such as mobile telephones like cell phones, the communications interface 970 includes a radio band electromagnetic transmitter and receiver called a radio transceiver. In certain embodiments, the communications interface 970 enables connection to the communication network 111 for a mechanism to determine dynamic information for generating dynamic access tokens to a location-based service. In various embodiments, the communication interface 970 may facilitate one or more wireless communications between a user device; for example a laptop computer, a tablet, a phablet, etc., and one or more other devices (e.g., a WLAN gateway, an RF identifier, etc.) via one or more WLAN communication protocols, proximity-based communication protocols (e.g., Bluetooth, NFC, RFID, IrDA, etc.), or the like.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980, and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed for a mechanism to determine dynamic information for generating dynamic access tokens to a location-based service as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps for a mechanism to determine dynamic information for generating dynamic access tokens to a location-based service.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein for a mechanism to determine dynamic information for generating dynamic access tokens to a location-based service. The memory 1005 also stores the data associated with or generated by the execution of the inventive steps.

Figure 11:
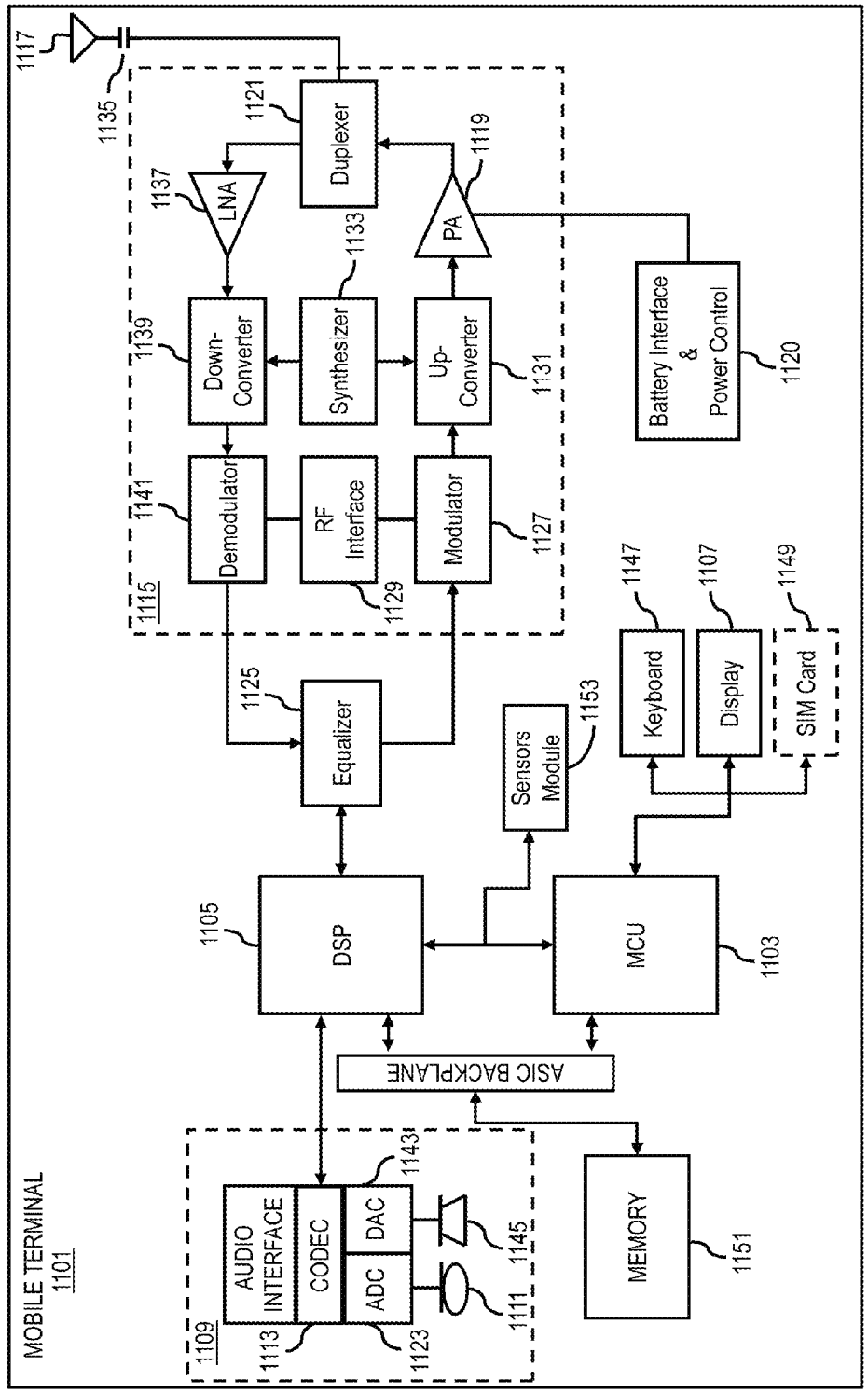
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps for a mechanism to determine dynamic information for generating dynamic access tokens to a location-based service. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps for a mechanism to determine dynamic information for generating dynamic access tokens to a location-based service. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 for a mechanism to determine dynamic information for generating dynamic access tokens to a location-based service. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Additionally, sensors module 1153 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1101 (e.g., a mobile phone), a user of the mobile terminal 1101, an environment of the mobile terminal 1101 and/or the user, or a combination thereof, wherein the data may be collected, processed, stored, and/or shared with one or more components and/or modules of the mobile terminal 1101 and/or with one or more entities external to the mobile terminal 1101.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining one or more dynamic information items associated with at least one location in which at least one service is available;
   determining at least one procedure for generating one or more access tokens associated with the at least one service;
   processing the one or more dynamic information items using the at least one procedure to cause a generation of the one or more access tokens,
   wherein the at least one procedure for generating the one or more access tokens is determined via (i) a location services application of a user equipment receiving the at least one procedure from another application and/or from one or more modules of the user equipment, (ii) one or more messages/notifications that may be requested and/or received by the user equipment from POI services, navigation services, search engines, or other service providers, (iii) utilizing the user equipment to capture an image of a graphical representation that may include encoded information on the procedure and/or on how to obtain the procedure, (iv) using the user equipment to interface with a memory tag for retrieving the procedure and/or information associated with the procedure, or (v) combination thereof;
   determining one or more attributes associated with a user, a user device, or a combination thereof that is requesting an access to the at least one service; and further generating the one or more access tokens based on the one or more attributes.

2. A method of claim 1, wherein the one or more dynamic information items include signal strength information from one or more identifiers associated with the at least one geographical boundary of the at least one location, the at least one service, or a combination thereof.

3. A method of claim 2, wherein the method further comprising:
processing radio frequency signal information to determine the user location with respect to the at least one geographical boundary.

4. A method of claim 3, wherein the generation of the one or more access tokens is based, at least in part, on the at least one user location.

5. A method of claim 4, wherein the method further comprises:
presenting one or more notifications with respect to an availability of the at least one service, the one or more access tokens, or a combination thereof based on the user location.

6. A method of claim 1, wherein the one or more dynamic information items is determined via a proximity-based communication channel, a network-based communication channel, a graphical representation, or a combination thereof.

7. A method of claim 1, wherein the at least one service includes a wireless communication network service.

8. A method of claim 1, wherein the method further comprises:
updating the one or more access tokens based on one or more changes in the one or more dynamic information items, in the at least one procedure, or a combination thereof, wherein the updating is prior to an expiration of a current access token.

9. A method of claim 1, wherein the method further comprises:
determining the one or more dynamic information items based on one or more transactions performed at the at least one location.

10. An apparatus comprising:
at least one processor; and
at least one memory including computer program code for one or more programs, the at least one memory and the computer program code configured to, with the at least one processor, cause the apparatus to perform at least the following,
determine one or more dynamic information items associated with at least one location in which at least one service is available;
determine at least one procedure for generating one or more access tokens associated with the at least one service; and service;
process the one or more dynamic information items using the at least one procedure to cause a generation of the one or more access tokens,
wherein the at least one procedure for generating the one or more access tokens is determined via (i) a location services application of a user equipment receiving the at least one procedure from another application and/or from one or more modules of the user equipment, (ii) one or more messages/notifications that may be requested and/or received by the user equipment from POI services, navigation services, search engines, or other service providers, (iii) utilizing the user equipment to capture an image of a graphical representation that may include encoded information on the procedure and/or on how to obtain the procedure, (iv) using the user equipment to interface with a memory tag for retrieving the procedure and/or information associated with the procedure, or (v) combination thereof;
determine one or more attributes associated with a user, a user device, or a combination thereof that is requesting an access to the at least one service; and
further generate the one or more access tokens based on the one or more attributes.

11. An apparatus of claim 10, wherein the one or more dynamic information items include signal strength information from one or more identifiers associated with at least one geographical boundary of the at least one location, the at least one service, or a combination thereof.

12. An apparatus of claim 11, wherein the apparatus is further caused to:
process radio frequency signal information to determine at least one user location with respect to the at least one geographical boundary.

13. An apparatus of claim 12, wherein the generation of the one or more access tokens is based, at least in part, on the at least one user location.

14. An apparatus of claim 13, wherein the apparatus is further caused to:
present one or more notifications with respect to an availability of the at least one service, the one or more access tokens, or a combination thereof based on the at least one user location.

15. An apparatus of claim 10, wherein the one or more dynamic information items is determined via a proximity-based communication channel, a network-based communication channel, a graphical representation, or a combination thereof.

16. An apparatus of claim 10, wherein the at least one service includes a wireless communication network service.

17. An apparatus of claim 10, wherein the apparatus is further caused to:
update the one or more access tokens based on one or more changes in the one or more dynamic information items, in the at least one procedure, or a combination thereof, wherein the update is prior to an expiration of a current access token.

18. An apparatus of claim 10, wherein the apparatus is further caused to:
determine the one or more dynamic information items based on one or more transactions performed at the at least one location.

* * * * *